(12) United States Patent
Wallett

(10) Patent No.: US 7,658,023 B2
(45) Date of Patent: Feb. 9, 2010

(54) BUCKET FOR A MECHANICAL SHOVEL

(76) Inventor: Grant Alan David Wallett, Renosterkop Farm JU195, Nelspruit 1200 (ZA)

( * ) Notice: Subject to any disclaimer, the term of this patent is extended or adjusted under 35 U.S.C. 154(b) by 92 days.

(21) Appl. No.: 10/586,904

(22) PCT Filed: Jan. 21, 2005

(86) PCT No.: PCT/IB2005/000153

§ 371 (c)(1),
(2), (4) Date: Apr. 24, 2007

(87) PCT Pub. No.: WO2005/071170

PCT Pub. Date: Aug. 4, 2005

(65) Prior Publication Data

US 2007/0214688 A1 Sep. 20, 2007

(30) Foreign Application Priority Data

Jan. 23, 2004 (ZA) .................................. 2004/0537

(51) Int. Cl.
*E02F 3/40* (2006.01)
*E02F 3/407* (2006.01)
(52) U.S. Cl. .............................. 37/345; 37/344; 37/398; 188/312
(58) Field of Classification Search ................... 37/398, 37/444, 445; 414/426; 60/469; 267/217, 267/137; 188/312, 317

See application file for complete search history.

(56) References Cited

U.S. PATENT DOCUMENTS

| 3,278,057 | A | * | 10/1966 | Drollinger et al. | .......... 414/716 |
| 4,280,600 | A | * | 7/1981 | Salmon et al. | .............. 188/312 |
| 5,499,463 | A | * | 3/1996 | Profio et al. | ................... 37/398 |
| 5,974,705 | A | | 11/1999 | Isley et al. | |
| 6,219,946 | B1 | | 4/2001 | Soczka | |
| 6,578,296 | B2 | * | 6/2003 | Kimoto et al. | ................. 37/443 |
| 7,322,449 | B2 | * | 1/2008 | Yamaguchi | .............. 188/282.3 |
| 2002/0062587 | A1 | * | 5/2002 | Kimoto et al. | ................. 37/466 |
| 2006/0230649 | A1 | * | 10/2006 | Gusella | ....................... 37/444 |

FOREIGN PATENT DOCUMENTS

WO 02/072964 A 9/2002

* cited by examiner

*Primary Examiner*—Thomas A Beach
(74) *Attorney, Agent, or Firm*—Ladas and Parry LLP

(57) ABSTRACT

This invention relates to a bucket (12) for a mechanical shovel (10). The bucket has a hollow body (16) provided with an inlet (14) for receiving material into its interior and an outlet (15) for discharging material therefrom. A door (18) is secured to the body and is movable between a closed condition in which it closes the outlet, and an open condition in which it permits discharge under gravity of material from the bucket. A buffering device in the form of a working fluid containing telescopically extensible and retractable piston-and-cylinder assembly (22) is operatively connected between the body and the door of the bucket for buffering movement of the door relative to the body. The assembly (22) includes a fluid flow control assembly (72) constructed and arranged to cause free fluid flow through the fluid flow assembly during opening of the door and to cause throttled fluid flow through the fluid flow assembly during closing of the door, such that movement of the door towards its closed condition is buffered.

7 Claims, 4 Drawing Sheets

BUCKET FOR A MECHANICAL SHOVEL

In accordance with the invention there is provided a bucket for a mechanical shovel, the bucket having a hollow body provided with an inlet for receiving material into its interior and an outlet for discharging material therefrom, the bucket having, secured to the body, a door which is movable relative to the body between a closed condition in which it closes the outlet of the bucket so that material cannot be discharged therefrom, and an open condition in which it permits discharge under gravity of material from the bucket, the bucket also including at least one buffering device operatively connected between the body and the door of the bucket for buffering movement of the door relative to the body, each buffering device being in the form of a working fluid-containing telescopically extensible and retractable piston-and-cylinder assembly, the piston-and-cylinder assembly including a fluid flow control assembly constructed and arranged to cause fluid flow through the fluid flow assembly during opening of the door and to cause throttled fluid flow through the fluid flow assembly during closing of the door, which throttled flow is throttled relative to the fluid flow during opening of the door, such that movement of the door towards its closed condition is buffered relative to movement of the door towards its open condition.

The fluid flow control assembly may include a non-return valve permitting flow of fluid through the flow control assembly only during opening of the door, and a throttle device for throttling fluid flow through the flow control assembly during closing of the door. The throttle device may be constructed to permit adjustment of the fluid flow rate through the flow control assembly, to permit adjustment of the degree of buffering. As will be appreciated, adjustment of the fluid flow rate through the flow control assembly, results in adjustment of the speed at which the door closes. The throttling device is typically a throttle valve. The fluid flow control assembly may also include a pressure-relief valve for overriding the action of the throttling device when the pressure of the fluid as it flows through the flow control assembly during closing of the door exceeds a predetermined threshold pressure, to discontinue the throttling and to permit relatively unrestricted fluid flow through the fluid flow control assembly.

The piston-and-cylinder assembly may include a cylinder and a piston longitudinally slidably received in the cylinder, the piston having a piston rod projecting longitudinally from an end of the cylinder and a piston head located in the cylinder and slidably sealingly engaging the wall of the cylinder, two compartments containing working fluid being defined respectively between the piston head and the respective opposite ends of the cylinder. The two compartments may be in flow communication with each other via the fluid flow control assembly, such that working fluid flows from one of the compartments to the other compartment via the flow control assembly in response to any change in length of the piston-and cylinder assembly during movement of the door relative to the body.

The door may be hingedly secured to the bucket, such that it hinges between its closed condition and its open condition, with the cylinder and the projecting end of the piston rod respectively being provided with securing formations by means of which the piston-and-cylinder assembly is hingedly secured in position between the body and the door.

The fluid flow control assembly may be located outside the interior of the cylinder of the piston-and-cylinder assembly. Instead, the fluid flow control assembly may be located in the interior of the cylinder of the piston-and-cylinder assembly. Conveniently, when located in the interior of the cylinder, the fluid flow control assembly may be located in the head of the piston.

The bucket may include a releasable latch for retaining the door in its closed condition.

The piston-and-cylinder assembly may be operatively connected between the body and the door such that opening of the door causes the piston-and-cylinder assembly to retract and closing of the door causes it to extend.

The piston-and-cylinder assembly may be a hydraulic assembly, the working fluid being a liquid, although gas such as nitrogen can be used instead.

The invention is now described, by way of example, with reference to the accompanying diagrammatic drawings.

Figure 1:
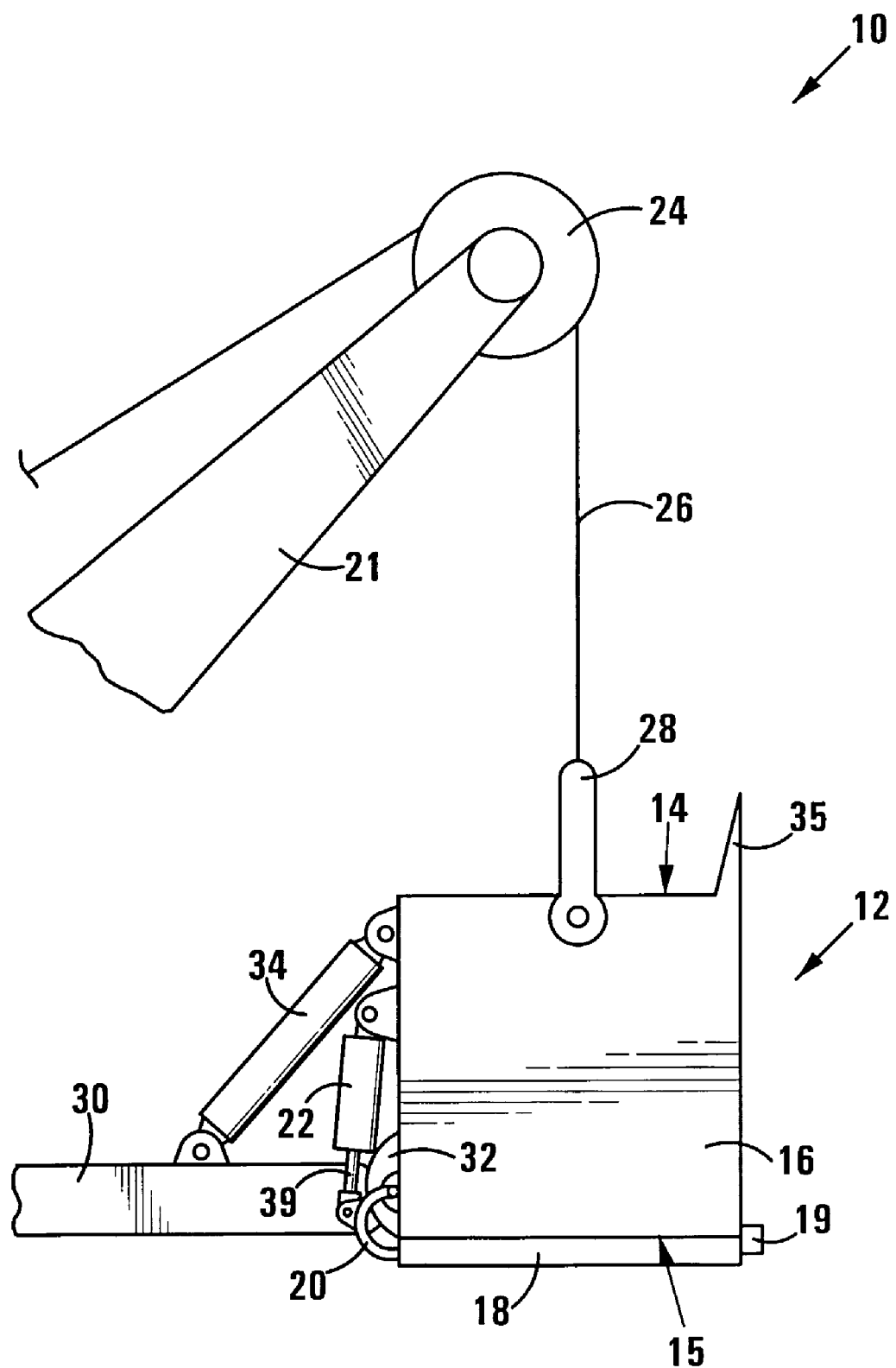
FIG. 1 shows a schematic side elevation of part of a mechanical shovel, the shovel including a bucket in accordance with the invention.
Figure 2:
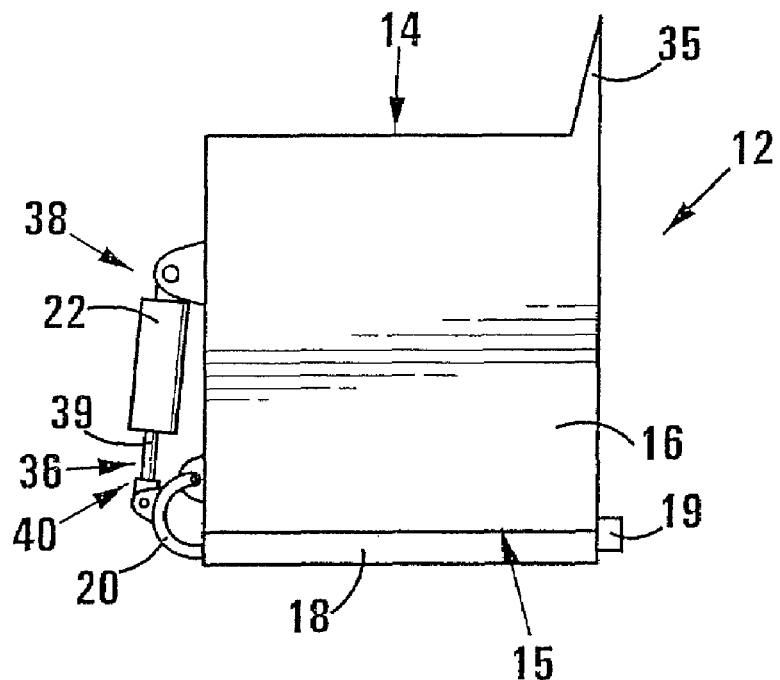
FIG. 2 shows a schematic side elevation of the bucket in accordance with the invention.

With reference to FIG. 1 of the drawings, a mechanical shovel or—digger, only part of which is shown, is generally indicated by reference numeral 10. The shovel 10 includes a bucket 12 in accordance with the invention (see also FIG. 2) for receiving fragmented material such as rubble to be moved and by means of which said material can be scooped up.

The bucket 12 is more or less box-shaped and has an open top 14 forming an inlet via which material is received into its interior. The open top 14 is defined by upper edges of a body 16 of the bucket 12, which body is defined by rectangular side walls, only one of which is visible and is not numbered. The bucket 12 also includes an outlet 15 at is lower end and a floor provided by a door in the form of a trap door 18, which trap door 18 is hingedly secured by means of a hinge 20 to the body 16 of the bucket 12 and closes the outlet 15.

A buffering device in the form of a hydraulically operated telescopically extensible and retractable piston-and-cylinder assembly 22 (see also FIG. 3) is pivotally connected about a horizontal axis to the hinge 20 of the trap door 18 and about a horizontal axis to the body 16 of the bucket 12 for controlling movement of the trap door 18 as hereinafter described. The piston-and-cylinder assembly 22 is arranged such that it extends in response to closing of the trap door 18 and such that it retracts in response to opening of the trap door 18. Naturally, in differently constructed embodiments of the bucket 12, the piston-and-cylinder assembly 22 can be arranged such that it retracts in response to closing of the trap door 18 and such that it extends in response to opening of the trap door 18.

The trap door 18 is movable, under gravity, between a closed condition (FIGS. 1 and 2) in which it forms a floor of the bucket 12, and an open condition (not shown) in which it is pivoted downwardly away, under gravity, from its closed condition to permit discharge under gravity of fragmented material from the bucket 12. The bucket 12 also includes a releasable latch (shown schematically at 19 in FIGS. 1 and 2) for retaining the trap door 18 in its closed condition.

The shovel 10 further includes a cantilever arm 21 having a free end on which a sheave or wheel 24 is rotatably mounted. A steel rope 26 is deflected over the sheave or wheel 24 and is secured to upper edges of side walls of the body 16 by means of a pivotable securing lever arrangement 28. The arm 21 and its associated cable 26 provide for lifting and lowering of the bucket 12.

The shovel 10 also includes a further cantilever arm 30 located below the arm 21, a free end of the arm 30 being pivotally connected about a horizontal axis to a bracket 32 (not shown in FIG. 2) mounted on a lower part of the body 16. An extensible and retractable connection 34 (shown schematically), which is typically in the form of a hydraulically operable telescopically extensible and retractable piston-and-cylinder-assembly, connects the upper part of the body 16 to the arm 30. This extensible and retractable connection 34 is pivotally connected to the body 16 and to the arm 30 at a position spaced from the bucket 12 about horizontal axis such that when the connection 34 extends, the bucket 12 is pivoted, about the axis of its connection to the arm 30 at the bracket 32, to a charging condition in which its open top 14 faces more or less horizontally such that teeth 35 (only one tooth being visible) projecting from the upper periphery of the body 16 extend more or less horizontally and can dig into fragmented material such as rubble and such that the material is received in the bucket 12. When the connection 34 retracts, it pivots the bucket 12 to the condition, as shown in FIG. 1, in which the latched closed trap door 18 serves as a floor of the bucket 12, and in which condition the material which has been scooped up into the bucket 12 is held therein.

Figure 3:
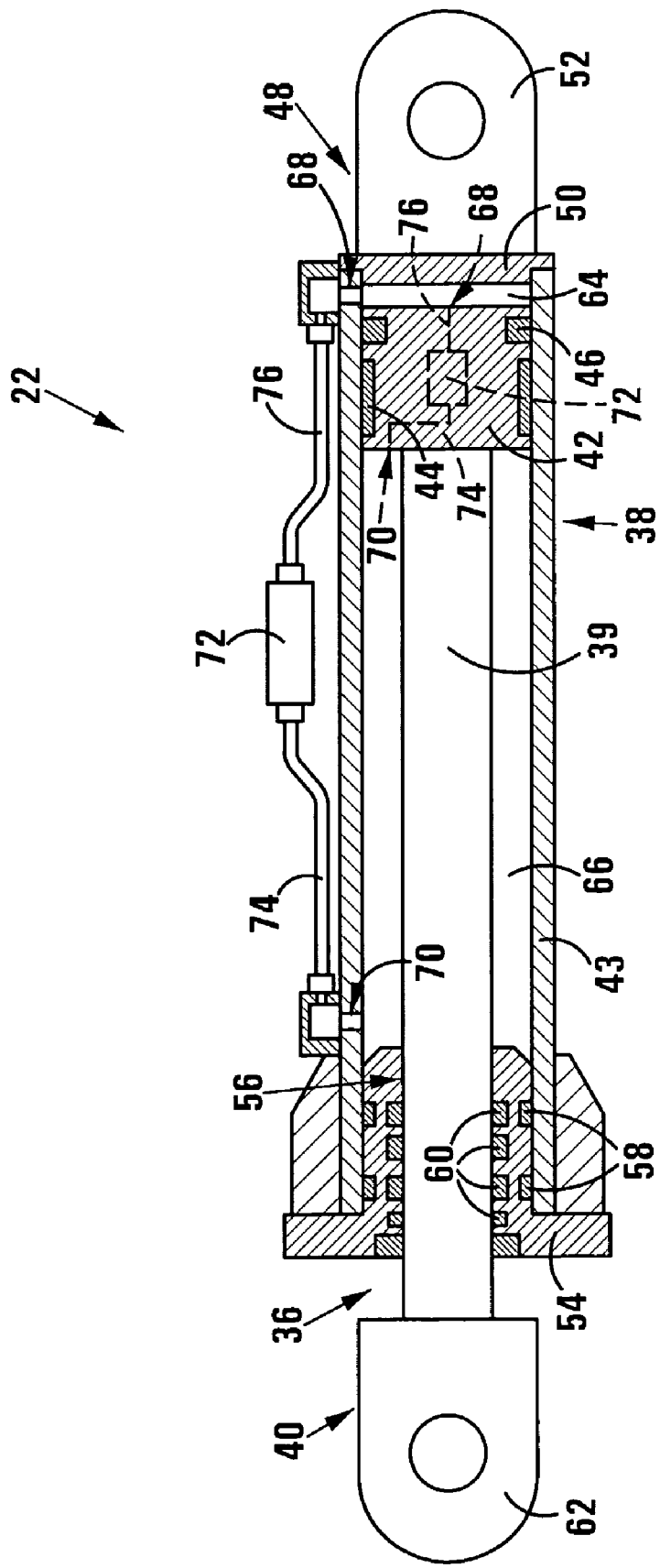
FIG. 3 shows a schematic axial section of a buffering device forming part of the bucket in accordance with the invention.

Referring now to FIG. 3 of the drawings, the piston-and-cylinder assembly 22 includes a piston 36 and an elongated cylinder 38 within which the piston 36 is longitudinally slidably received. The piston 36 has a piston rod 39 having an outwardly projecting end 40 which projects from one end of the cylinder 38, and a piston head 42 which is sealingly axially slidably received in the cylinder 38. Sealing between the piston head 42 and a wall 43 of the cylinder 38 is effected by means of an annular seal 46. An annular bearing strip 44 is provided between the piston head 42 and the wall 43, the strip 44 being axially inwardly spaced from the seal 46.

The cylinder 38 has an end 48 which is closed off by means of an end plate 50 which incorporates a securing formation in the form of a connecting bracket 52 for pivotable connection to the body 16 of the bucket 12. The opposite end of the cylinder 38, in turn, is sealed off by an end plate 54 which includes a spigot or plug received spigot-fashion into said opposite end of the cylinder 38, the end plate 54 being secured to the cylinder 38. The end plate 54 is provided with a central opening 56 receiving the rod 39 of the piston 36. To this end, the end plate 54 is of brass, so that its wall defining said central opening also contributes to the sealing. Two axially spaced annular seals 58 ensure a sealing abutment between the plug of the end plate 54 and the wall 43 of the cylinder 38. In turn, four axially spaced annular seals 60 effect sealing in the central opening 56 between the plug of the end plate 54 and the piston rod 39.

The projecting end 40 of the piston rod 39 is also provided with a securing formation in the form of a connecting bracket 62 for pivotable connection thereof to the bracket 20 of the trap door 18.

The piston head 42 divides the interior of the cylinder 38 into two compartments respectively indicated by reference numerals 64 and 66 in which a hydraulic fluid is received. The Applicant has found that AZOLLA™ ZS68 or AZOLLA™ ZS45 hydraulic fluid or oil available from TOTAL SOUTH AFRICA (PROPRIETARY) LIMITED is advantageously used. In this regard, it will be appreciated that a so-called soluble oil, soluble in water, will normally be used in warm environments, and that synthetic fluid or oil, which resists freezing, will normally be used in cold environments. Openings 68 and 70 provided in the wall 43 of the cylinder 38 respectively provide access into the respective compartments 64, 66.

Figure 4:
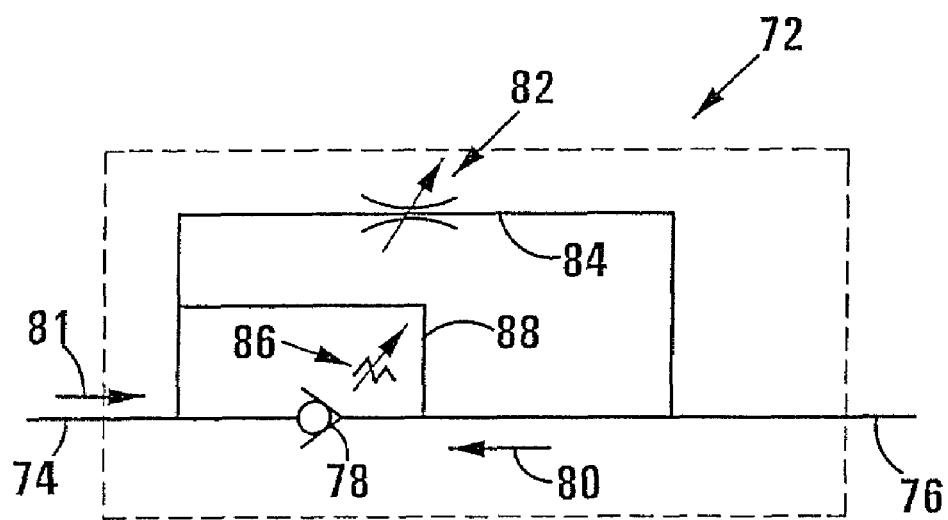
FIG. 4 shows a flow diagram of a fluid flow control assembly forming part of the buffering device shown in FIG. 3.

The piston-and-cylinder assembly 22 further includes a fluid flow control assembly 72 (see also FIG. 4) for controlling flow of the hydraulic fluid between the two compartments 64, 66. The two compartments 64, 66 are in communication with each other by means of fluid flow lines 74, 76 which are joined together by the fluid flow control assembly 72.

The fluid flow control assembly 72 includes a one-directional or non-return valve 78 permitting relatively free or unrestricted fluid flow in the direction indicated by arrow 80, i.e. fluid flow from the compartment 64 to the compartment 66, such that retraction of the piston-and-cylinder assembly 22 is relatively unrestricted. In use, opening of the trap door 18 is thus relatively unrestricted by the assembly 22.

Fluid flow in the direction indicated by arrow 81, i.e fluid flow from the compartment 66 to the compartment 64 in response to extension of the piston-and-cylinder assembly 22 when the trap door 18 is closed, is throttled by means of an adjustable throttle valve 82 provided in a fluid flow line 84 which bridges or by-passes the non-return valve 78, i.e. it is in parallel therewith. The fluid flow control assembly 72 further includes a relief valve 86 provided in parallel with both the non-return valve 78 and the throttle valve 82, which relief valve 86 acts as a safety valve when a permitted threshold pressure of hydraulic fluid flowing through the throttle valve 82 is exceeded. The relief valve 86 is located in a fluid flow line 88 in parallel with the fluid flow lines 74 and 84. As will be appreciated, when the piston-and-cylinder assembly 22 are arranged such that it retracts in response to closing of the trap door 18 and such that it extends in response to opening of the trap door 18, the arrangement of the fluid flow control assembly 72 will be the reverse of what is hereinbefore described, i.e. flow from the compartment 66 to the compartment 64 will be relatively unrestricted, whilst flow from the compartment 64 to the compartment 66 will be throttled.

The compartments 64, 66 and the fluid flow connection therebetween, i.e. the flow lines 74, 76 and the fluid flow control assembly 72, thus form a closed system. Because the space that the rod 39 occupies in the cylinder 38 changes as the piston 36 is displaced relative to the cylinder 38, the volume of the said closed system changes upon displacement of the piston 36 relative to the cylinder 38, increasing as the assembly 22 extends and decreasing as it retracts.

Further, although the fluid flow control assembly 72 is illustrated as being outside the cylinder 38, it can naturally be located inside the cylinder 38, e.g. in the piston head 42 as shown in broken lines in FIG. 3.

In use, when material has been received in the bucket 12 and the bucket 12 has been pivoted to the condition shown in FIG. 1, the mechanical shovel 10 is moved to a position where the material is to be discharged. Upon discharge, the latch 19 is released and the trap door 18 pivots under gravity towards its open condition, which pivoting movement is relatively unrestricted due to the particular configuration of the piston-and-cylinder assembly 22. Material thus discharges more or less freely and rapidly under gravity from the bucket 12. The mechanical shovel 10 is then moved back to an area from which material is to be removed and the bucket 12 is pivoted by means of the secondary arm 30 and moved to a required height by means of the steel rope 26 to a charging condition as hereinbefore described in which material can be scooped up.

Upon pivoting of the bucket 12 towards said charging condition in which material can be scooped up, the trap door 18 pivots under gravity towards its closed condition. Due to the particular configuration of the piston-and-cylinder assembly 22, such pivoting of the trap door 18 into its closed condition is buffered so that the trap door 18 closes in a cushioned and controlled fashion, thereby inhibiting or reducing damage to the mechanical shovel 10 arising from excessive shocks and vibrations which otherwise occur as the trap door 18 comes more or less forcibly into contact with the body 16 of the bucket 12 upon closing.

As will be appreciated, in other embodiments (not shown), the piston 38 can include another rod (not shown) fast with and projecting from the opposite side of the piston head 42 as the rod 39. In this case, the end plate 50, like the end plate 54, will be provided with a central opening receiving said other rod, such that said other rod projects from the end 48 of the cylinder 38. Naturally, said other rod will not be fast with the securing formation 52, and will be longitudinally displaceable relative thereto. In this embodiment, the volume of the closed system constituted by the compartments 64, 66 and the fluid flow connection therebetween will remain constant during displacement of the piston 39 in the cylinder 38.

Figure 5:
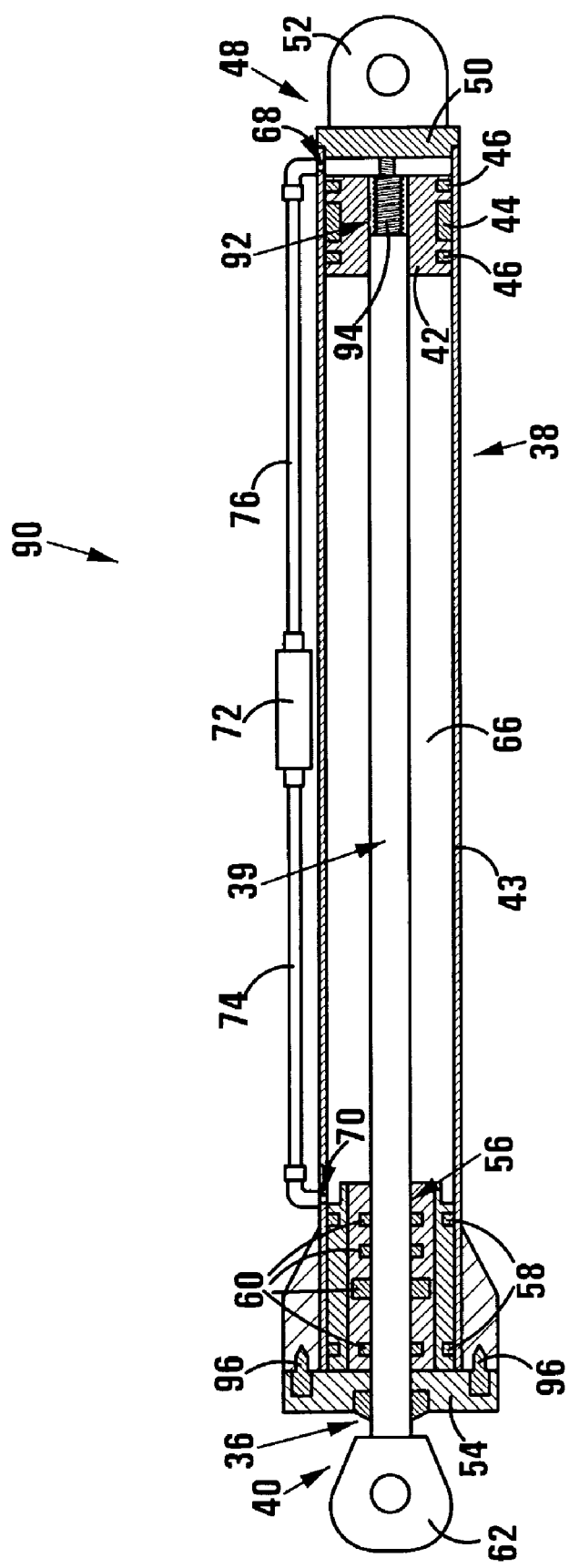
FIG. 5 shows a schematic axial section of another embodiment of a buffering device forming part of a bucket in accordance with the invention.

Referring now to FIG. 5 of the drawings, a variant embodiment of the buffering device is generally indicated by reference numeral 90. The device 90 in many respects resembles the device 22 and, accordingly, unless otherwise indicated, like reference numerals used to indicate parts or features of the device 22 are used to indicate like parts or features of the device 90.

In the embodiment shown in FIG. 5, the end of the piston rod 39 associated with the piston head 42 is, on the one hand, provided with an internally screw-threaded socket (not visible). The piston head 42, on the other hand, is provided with an axially extending passage 92, in which passage 92 an axially extending externally screw-threaded spigot 94 is secured, the socket defined by the said end of the piston rod 39 being screw-theadingly received on the screw-threaded spigot 94. This particular construction thus provides for easy removal of the piston rod 39 from the cylinder 38, by unscrewing said socket from the spigot 94, should the need arise.

Furthermore, in the embodiment shown in FIG. 5, sealing between the piston head 42 and the wall 43 of the cylinder 38 is effected by means of two axially spaced seals 46, axially spaced on opposite sides of the bearing strip 44. The assembly 90 is further provided with two alignment pins 96 which provide for circumferential alignment of the end plate 54 relative to the cylinder 38. Typically, in this embodiment, the end plate 54, once aligned, is secured to the cylinder 38 by means of welding. Likewise, the externally screw-threaded spigot 94 is secured to the piston head 42 by means of welding.

The buffering device 90 functions in exactly the same fashion as the device 22 and, accordingly, the functioning of the device 90 is not described.

The device 22 can thus be fitted to the bucket 12 of a mechanical shovel 10 to reduce damage to the shovel 10 arising from shocks and/or vibrations caused by the trap door 18 slamming closed against the body 16 of the bucket 12. Further, the device 22 can also reduce noise pollution.

The invention claimed is:

1. A bucket (12) for a mechanical shovel (10), the bucket having a hollow body (16) provided with an inlet (14) for receiving material into its interior and an outlet (15) for discharging material therefrom, the bucket having, secured to the body, a door (18) which is movable relative to the body between a closed condition in which it closes the outlet of the bucket so that material cannot be discharged therefrom, and an open condition in which it permits discharge under gravity of material from the bucket, the bucket also including at least one buffering device (22) operatively connected between the body and the door of the bucket for buffering movement of the door relative to the body, the bucket being characterized in that each buffering device is in the form of a telescopically extensible and retractable piston-and-cylinder assembly (22) for containing a working liquid including a cylinder (38) and a piston (36) longitudinally slidably received in the cylinder, the piston having a piston rod (39) projecting longitudinally from only one end of the cylinder and a piston head (42) located in the cylinder and slidably sealingly engaging the wall (43) of the cylinder, two compartments (64, 66) for the working liquid being defined respectively between the piston head and the respective opposite ends of the cylinder, the piston-and-cylinder assembly being operatively connected between the body and the door such that opening of the door causes the piston-and-cylinder assembly to retract and closing of the door causes it to extend, the piston-and-cylinder assembly also including a fluid flow control assembly (72) via which the two compartments are in fluid flow communication with each other, the fluid flow control assembly being constructed and arranged to cause liquid flow through the fluid flow control assembly from the compartment (64) remote from the end of the cylinder from which the piston rod projects to the compartment (66) adjacent the end of the cylinder from which the piston rod projects during opening of the door and to cause throttled liquid flow through the fluid flow control assembly from the compartment adjacent the end of the piston from which the piston rod projects to the compartment remote from the end of the cylinder from which the piston rod projects during closing of the door, which throttled flow is throttled relative to the liquid flow during opening of the door, such that, in use, movement of the door towards its closed condition is buffered relative to movement of the door towards its open condition and the total volume of the two compartments decreases when the door moves towards its open condition and increases when it moves towards its closed condition; wherein the fluid flow control assembly includes a non-return valve (78) permitting flow of liquid therethrough during opening of the door, and a throttle device (82) for throttling liquid flow through the flow control assembly during closing of the door.

2. A bucket as claimed in claim 1, characterized in that the throttle device is constructed to permit adjustment of the liquid flow rate through the flow control assembly, to pennit adjustment of the degree of buffering.

3. A bucket as claimed in claim 1, characterized in that the fluid flow control assembly includes a pressure-relief valve (86) for overriding the action of the throttling device when the pressure of the liquid upstream of the throttling device during closing of the door exceeds a predetermined threshold pressure, to discontinue the throttling.

4. A bucket as claimed in claim 1, characterized in that the door is hingedly secured to the bucket, such that it hinges between its closed condition and its open condition, with the cylinder and the projecting end of the piston rod respectively being provided with securing formations (52, 62) by means of which the piston-and-cylinder assembly is hingedly secured in position between the body and the door.

5. A bucket as claimed in claim 1, characterized in that the fluid flow control assembly is located outside the interior of the cylinder of the piston-and-cylinder assembly.

6. A bucket as claimed in claim 1, characterized in that the fluid flow control assembly is located in the interior of the cylinder of the piston-and-cylinder assembly.

7. A bucket as claimed in claim 1, characterized in that the bucket includes a releasable latch (19) for retaining the door in its closed condition.

* * * * *